US00RE40085E

(19) United States
(12) Reissued Patent
Jürs et al.

(10) Patent Number: US RE40,085 E
(45) Date of Reissued Patent: Feb. 19, 2008

(54) DEVICE AND METHOD FOR PROCESSING MEAT

(75) Inventors: Michael Jürs, Haffkrug (DE); Matthias Schröder, Badendorf (DE); Conrad Torkler, Zecher (DE)

(73) Assignee: Nordischer Maschinenbau Rud. Baader GmbH + Co. KG, Hamburg (DE)

(21) Appl. No.: 11/351,219

(22) PCT Filed: Jul. 23, 1999

(86) PCT No.: PCT/EP99/05283

§ 371 (c)(1),
(2), (4) Date: Apr. 19, 2001

(87) PCT Pub. No.: WO00/07452

PCT Pub. Date: Feb. 17, 2000

Related U.S. Patent Documents

Reissue of:
(64) Patent No.: 6,604,991
Issued: Aug. 12, 2003
Appl. No.: 09/744,519
Filed: Apr. 19, 2001

(30) Foreign Application Priority Data

Jul. 31, 1998 (DE) ..... 198 34 524

(51) Int. Cl.
*A22C 18/00* (2006.01)

(52) U.S. Cl. ..... 452/150

(58) Field of Classification Search ..... None
See application file for complete search history.

(56) References Cited

U.S. PATENT DOCUMENTS

| | | | | |
|---|---|---|---|---|
| 4,557,019 | A | | 12/1985 | Van Devanter et al. |
| 4,875,254 | A | * | 10/1989 | Rudy et al. ..... 452/157 |
| 5,042,340 | A | | 8/1991 | Kasper |
| 5,184,733 | A | | 2/1993 | Arnarson et al. |
| 5,324,228 | A | | 6/1994 | Vogeley, Jr. ..... 452/150 |
| 5,580,306 | A | | 12/1996 | Young et al. ..... 452/148 |
| 5,591,076 | A | | 1/1997 | Evers et al. ..... 452/157 |

FOREIGN PATENT DOCUMENTS

| | | |
|---|---|---|
| DE | 3239125 | 10/1982 |
| EP | 266 441 | 5/1988 |
| EP | 288 592 | 11/1988 |
| EP | 429 711 | 6/1991 |
| JP | 1-202134 | 8/1989 |
| SE | 170906 | 11/1957 |

* cited by examiner

*Primary Examiner*—Thomas Price
(74) *Attorney, Agent, or Firm*—Mattingly, Stanger, Malur & Brundidge, P.C.

(57) ABSTRACT

Device for processing flesh, including at least one transport means, at least one element for position detection as well as at least one separating means and at least one regulating and/or control device, wherein the separating means communicates by means of the regulating and/or control device with the element for position detection.

14 Claims, 7 Drawing Sheets

DEVICE AND METHOD FOR PROCESSING MEAT

Figure 1:
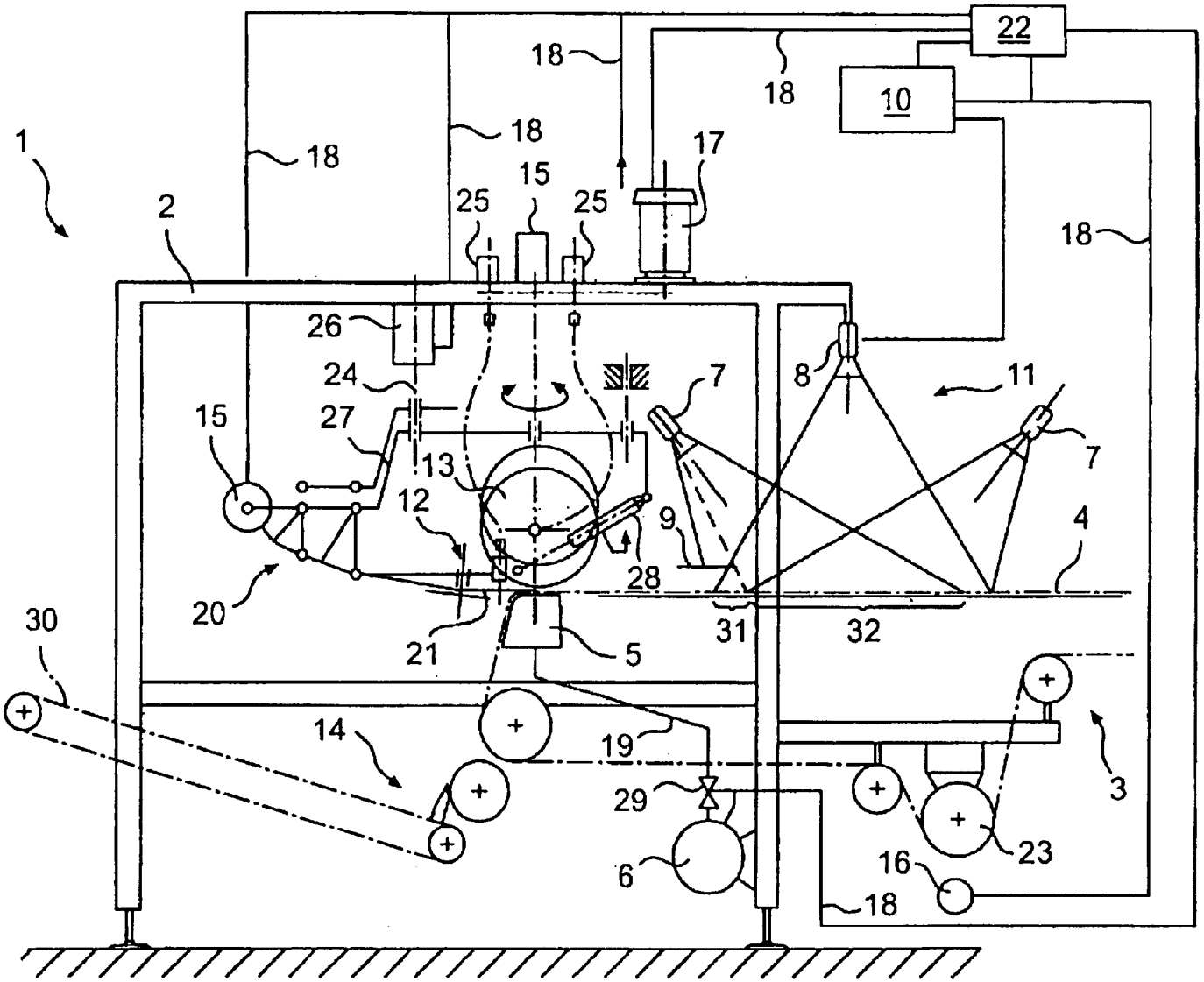

Matter enclosed in heavy brackets [ ] appears in the original patent but forms no part of this reissue specification; matter printed in italics indicates the additions made by reissue.

The invention concerns a device or a method for processing flesh such as e.g. fish. Such a method or such a device is known, for example from U.S. Pat. No. 4,557,019. In this an automatic fish fillet cutting device together with associated method is disclosed, producing portions with a predetermined weight. Here it is a drawback that determination of the density of the fish fillet necessitates several manual working steps. Another drawback results from the fact that cutting of the fillet pieces is effected transversely to the direction of conveying.

It is the object of the present invention to provide a device or a method which enable automated reliable and flexible processing of fish.

The object is achieved according to the invention by the fact that a device for processing flesh is provided, including at least one transport means, at least one element for position detection as well as at least one separating means and at least one regulating and/or control device, wherein the separating means communicates by means of the regulating and/or control device with the element for position detection. A development according to the invention provides that the separating means is arranged essentially freely slidably in the space in order to perform precise cuts.

In another development according to the invention it is provided that the separating means comprises at least one circular blade.

Further it can be provided according to the invention that a device for processing flesh is provided, including at least one transport means at least one element for position detection as well as at least one means for removing areas of different consistency and at least one regulating and/or control device, wherein the means for removing areas of different consistency communicates by means of the regulating and/or control device with the element for position detection.

A development according to the invention provides that the means for removing areas of different consistency comprises at least two precisely spaced-apart circular blades.

In another development according to the invention it is provided that the device includes an element for position detection, wherein this element for position detection comprises at least one transmitter and at least one receiver.

Further it can be provided according to the invention that the transmitter is a light source and the receiver is an optoelectronic system.

A development according to the invention provides that between transmitter and receiver is arranged at least one shading element.

In another development according to the invention it is provided that the separating means is arranged essentially parallel to the transport means.

Further it can be provided according to the invention that a method is provided in which a device according to one or more of the above claims is used.

Figures 2A, 2B:
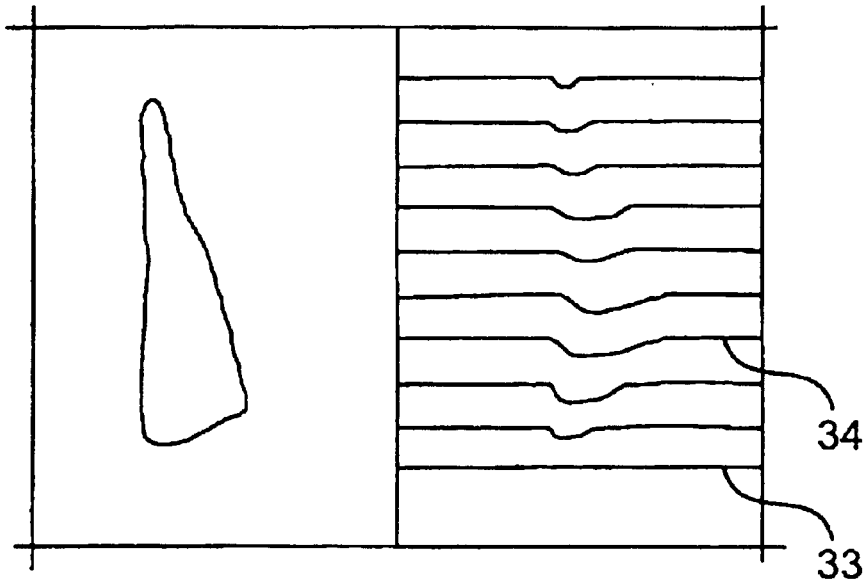
Figure 2C:
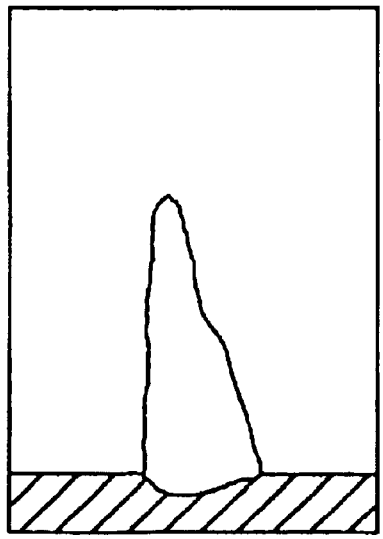
Figure 3:
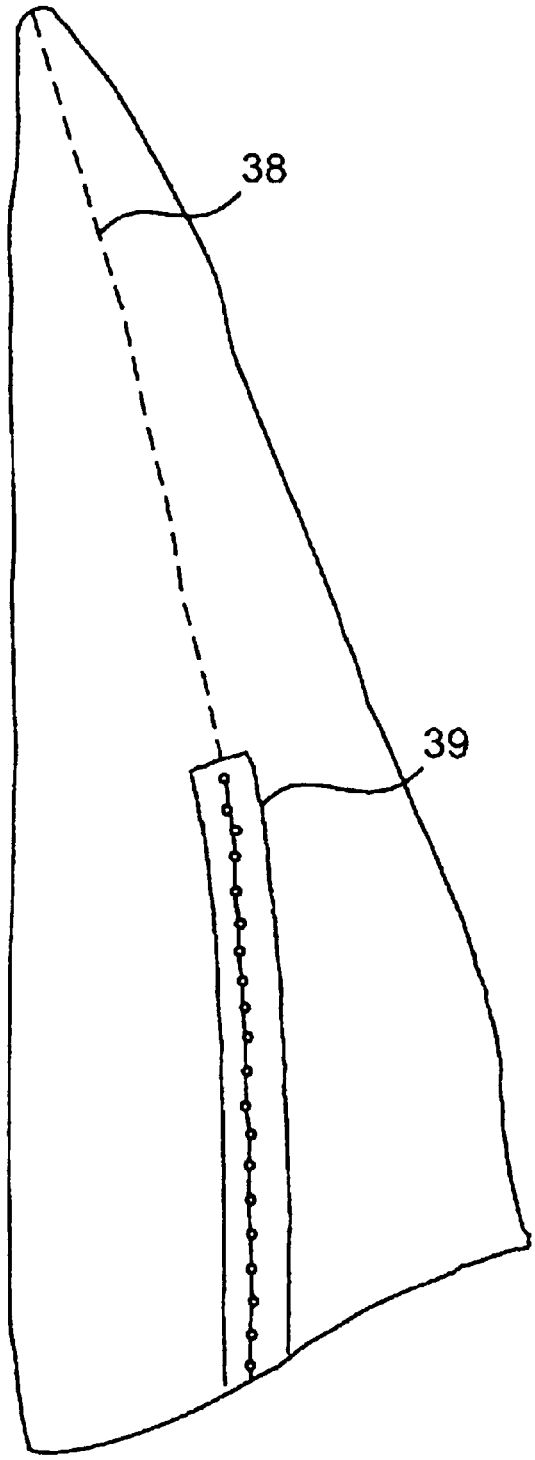
Figure 4:
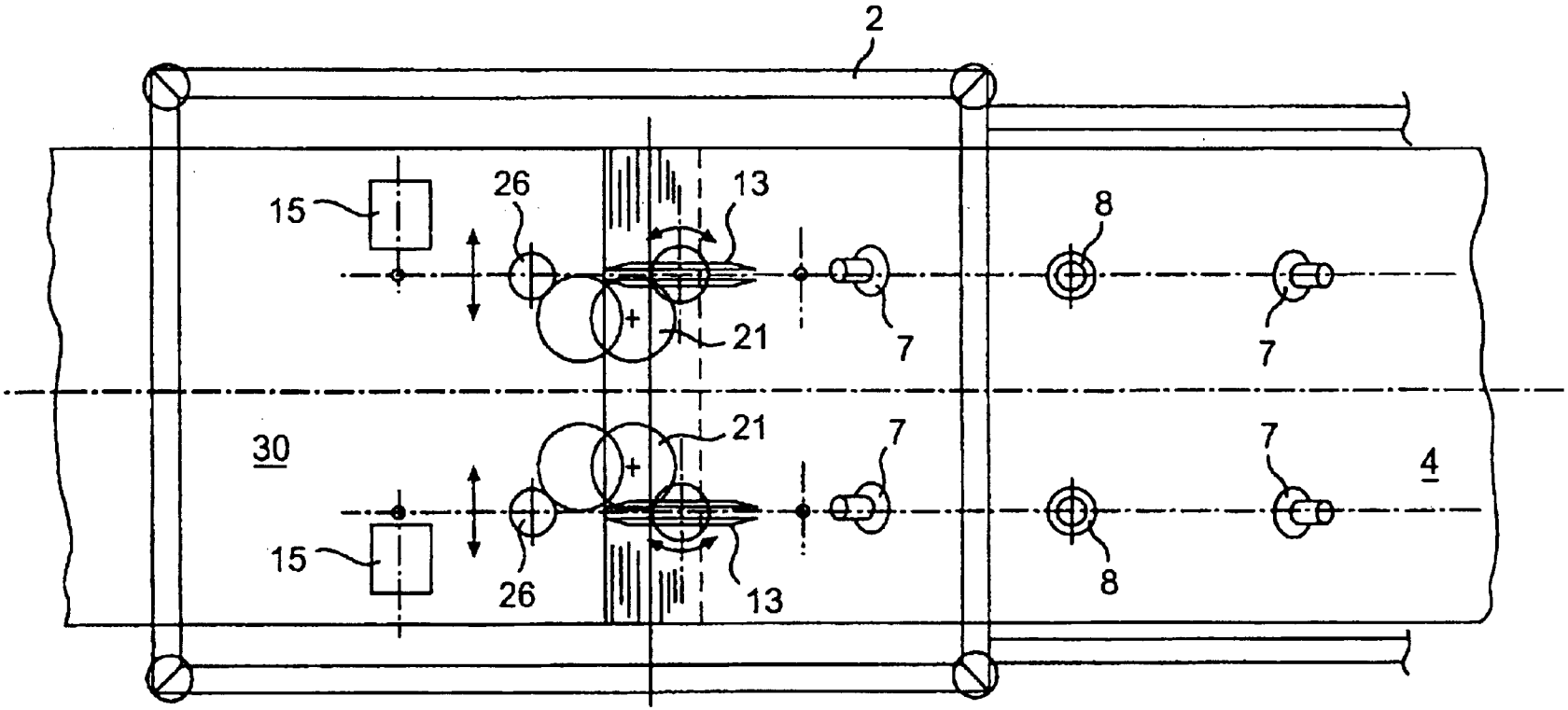
Figure 6B:
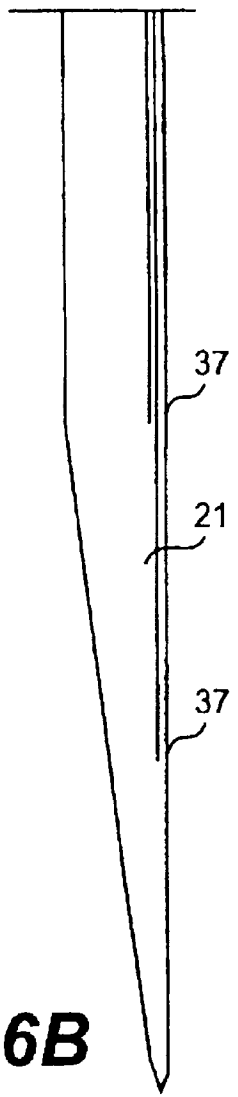
Figure 6A:
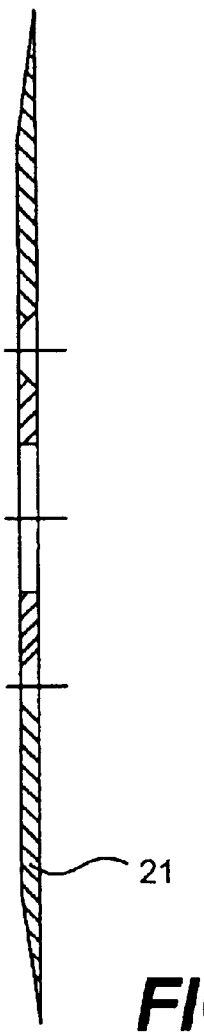
Figure 5:
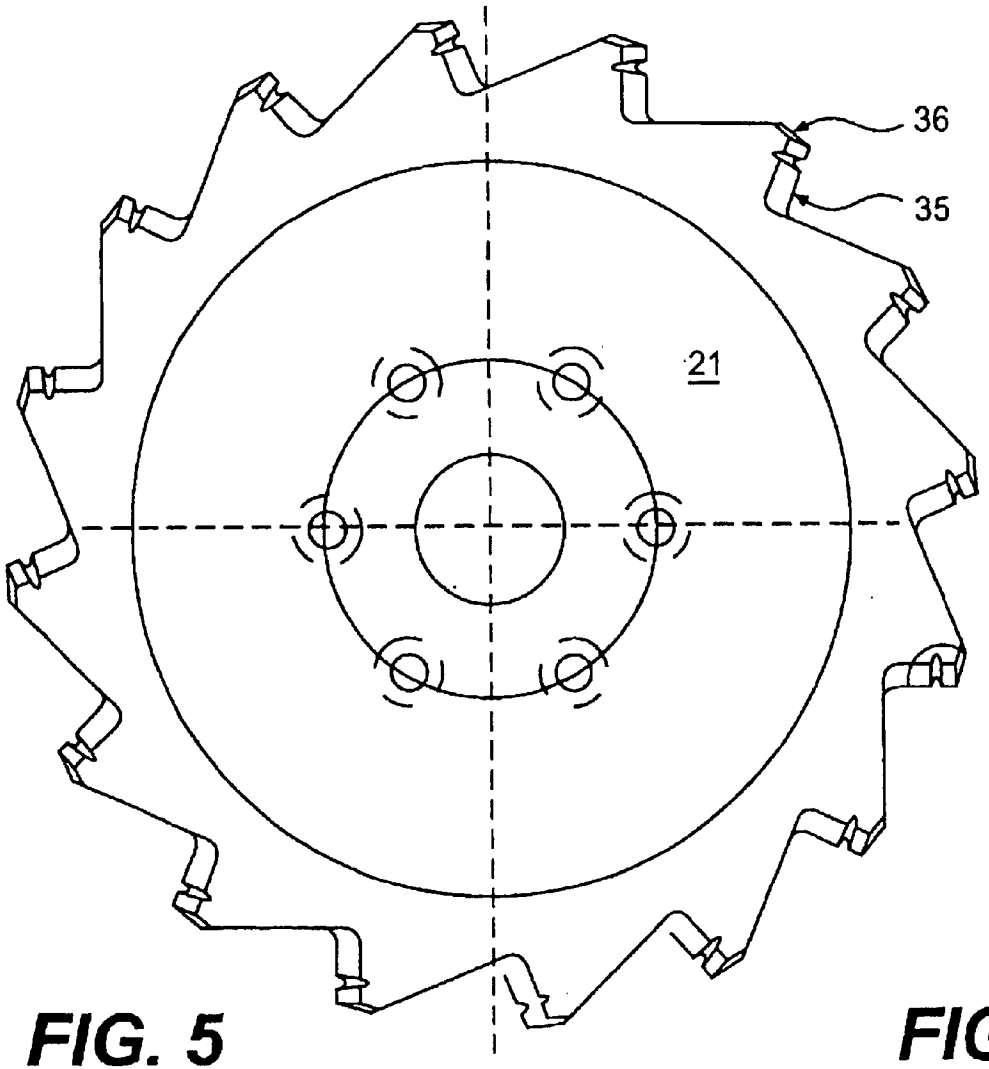

A practical example of the invention is shown in the drawings below. They show:

FIG. 1 a side view of the device showing schematically the element for position detection FIGS. 2a–c displays of the recordings filed in the memory of the image computer FIG. 3 is a view of a fillet after computer determination of the pinbone region FIG. 4 a top view of the device FIG. 5 a top view of the horizontal blade FIG. 6a a section through the horizontal blade according to FIG. 5

FIG. 6b an enlarged view of the section according to FIG. 6a

Figure 7:
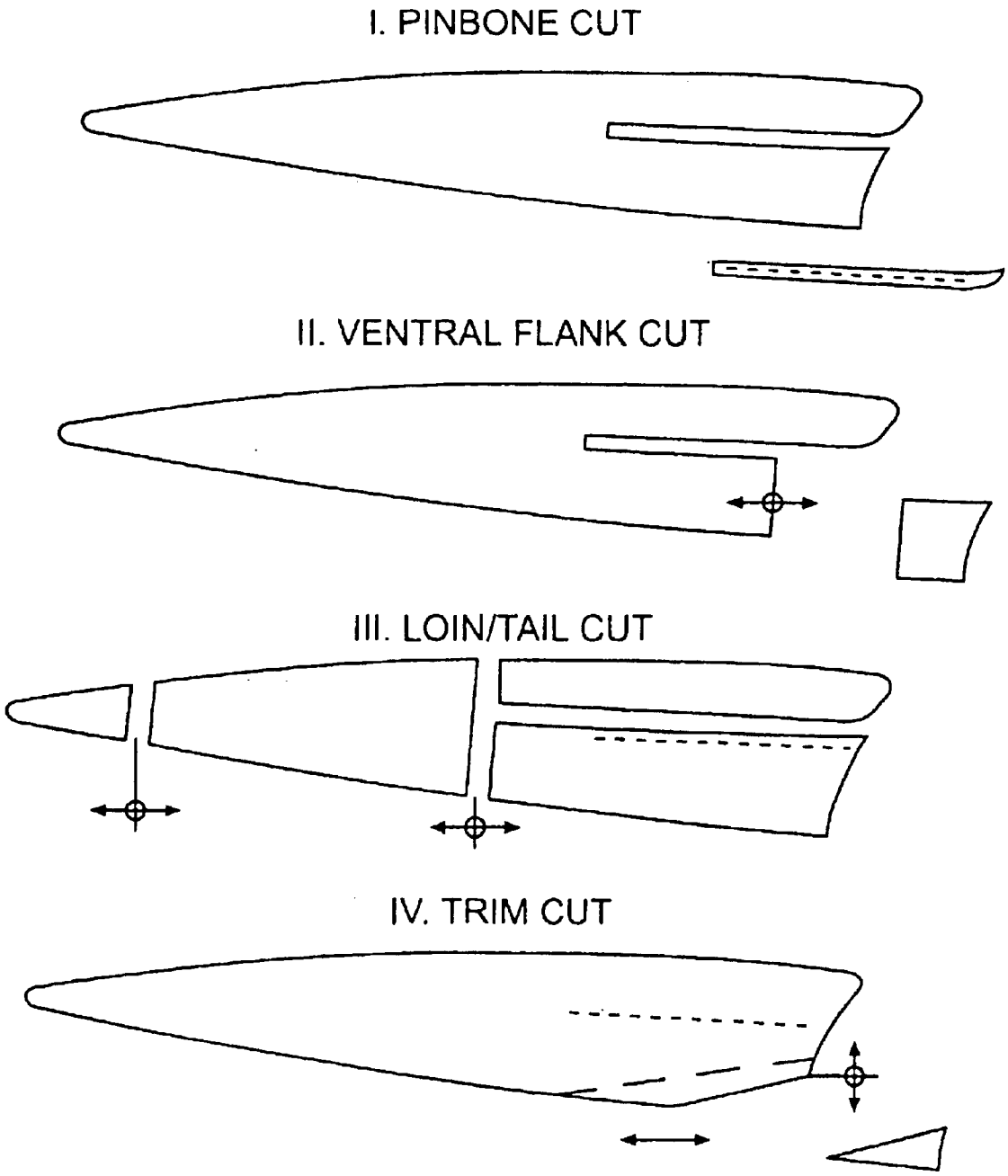

FIG. 7 cutting variants

Figure 8:
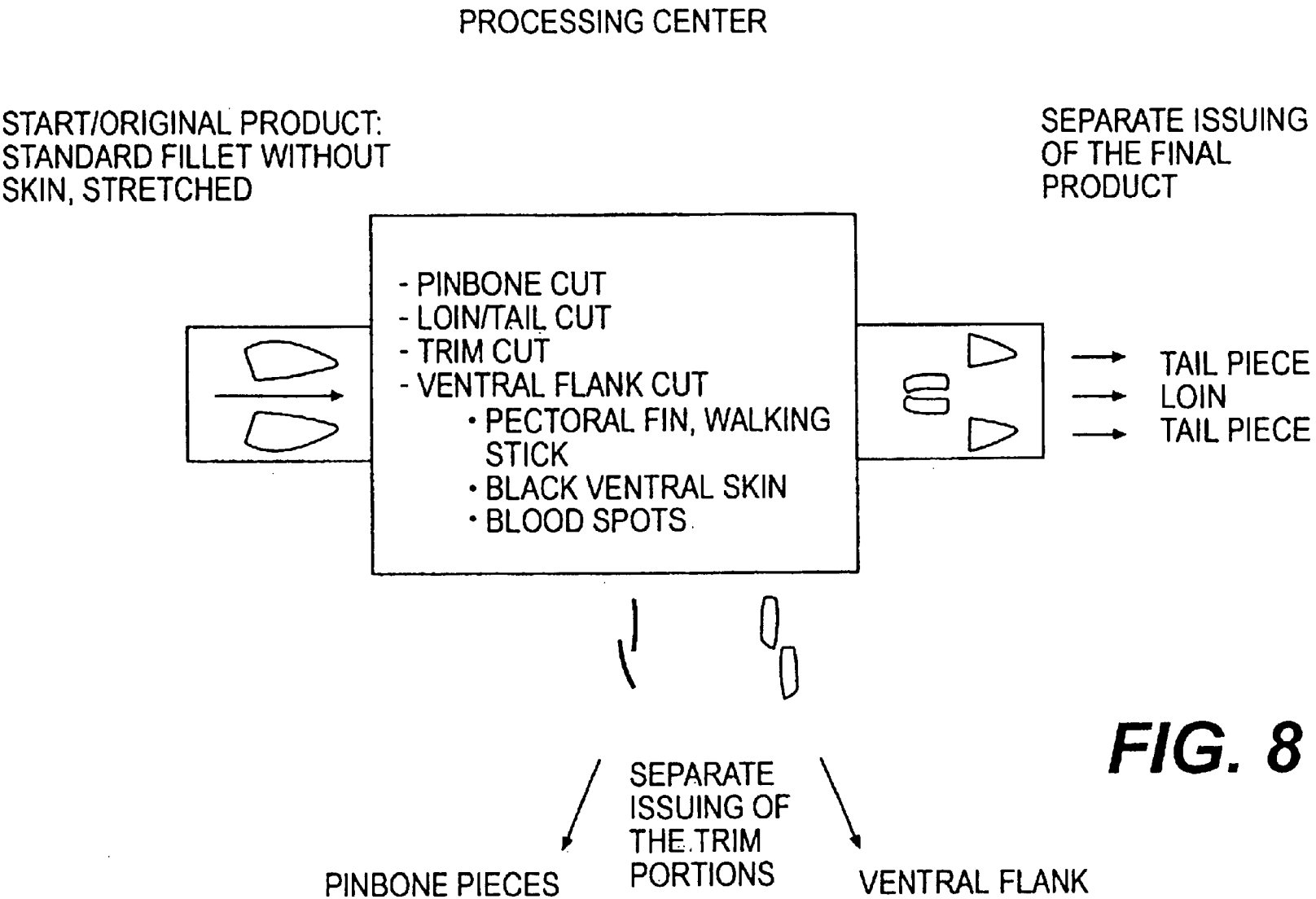

FIG. 8 schematic view

The device for processing 1 includes, as shown in FIG. 1, a housing 2, a transport means 3, wherein the transport means 3 has a perforated conveyor belt 4. In the processing region of the device 1 is located a suction box 5 which draws in the fillets lying on the perforated conveyor belt 4 during mechanical processing through the holes in the conveyor belt 4. The suction box 5 is connected by means of a suction pipe 19 to the vacuum pump 6, the vacuum pump 6 ensuring the required partial pressure. The device has an element for position detection 11 (FIG. 2) which has two transmitters 7, which in this embodiment are designed as a light source. Furthermore for the light sources 7 there is a corresponding receiver 8 which is here constructed as an electronic camera. To provide areas of different illumination, between light source 7 and projection surface is arranged a shading element 9 which produces on the conveyor belt 4 a shadow region and an illuminated region. The electronic camera 8 is connected by signal wires 18 to the image computer 10. In the processing region above the suction box 5 are located separating means 12 including two essentially parallel, spaced-apart circular blades 13 arranged essentially vertically or within an angular range from 45° to 90° to the conveyor belt 4 and arranged essentially in the direction of conveying as well as a horizontal blade 21 which is arranged essentially transversely to the direction of conveying of the conveyor belt 4. In an alternative embodiment the spaced-apart separating means 12 can also be arranged obliquely to each other. Following and essentially below the conveyor belt 4 is located a skinning device 14 known in the art, as shown for example in JP 1202134 or SE 170906. Further, such skinning devices are known as Baader 52, wherein in the embodiment shown here the subsequent skinning refers only to fillets without a pinbone strip and/or ventral flank. By means of the stepping motor 15, the circular blades 13 and the horizontal blade 21 are controlled essentially in a plane parallel to the conveyor belt 4 as a function of the signals transmitted via control wires 18 to the stepping motor.

The speed pick-up or clock signal generator 16 is coupled to the conveyor belt drive motor 23 and delivers the information on movement of the transport means 3 or its conveyor belt 4 via the signal wires 18 to the image computer 10 and to the regulating/control device 22. The blades 13, 21 described above are driven by means of flexible shafts which are coupled by a reduction gear for flexible shafts 25 to the blade drive motor 17, wherein the blade drive motor operates at constant speed. In an alternative embodiment the blade drive motor communicates via signal wires 18 with the regulating/control device. The control/signal wires 18 connect all functional elements of the device 1 to the regulating/control device 22, so that essentially the blades 13 and 21, taking into account the individual position of the fillets on the conveyor belt 4 after image evaluation followed by computer analysis of the pinbones and e.g. the ventral flank of the fish fillets, are controlled in such a way that the pinbone strip is separated out from the fillet without skin by the essentially parallel, spaced-apart circular blades 13, and the ventral flank is separated out by the horizontal blade 21. The drive mechanism of the horizontal blades 20 ensures, together with the horizontal blade pivot device 28, that the horizontal blade 21 swings in, the moment the perforated conveyor belt conveys the ventral flank of the fish fillet into the radius of action of the horizontal blade 21. The blade pivot device 28 operates in this embodiment pneumatically, and receives the pivot signal from the control device 22 at the appropriate moment by means of the signal wires 18, and moves the blade 21 into a plane parallel to the conveyor belt 4 or to the fish fillet in order to separate the ventral flask essentially from the skin of the fillet. Analogously, the pair of circular blades 13 are lowered into the fillet the moment the control device 22 signals impingement of the pinbone strip to the circular blade lifting/lowering device 24 by means of the signal wires 18, in such a way that only the pinbone strip is separated from the skin of the fillet by means of a chisel which is arranged between the blades 13, and for this eventually the blade 21 remains in the waiting position (outside the cutting region). By means of the stepping motor 26, which can be seen in FIG. 5, the common blade support 27 on which both the circular blades 13 and the horizontal blade 21 are arranged is brought into the position determined by the control unit. The suction box 5, which is supplied with partial pressure by means of suction pipe 19 and vacuum pump 6, always needs essentially the optimum suction power when a fillet passes into its input region. For this reason, in the suction pipe 19 is arranged a control valve 29 which, at the moment signalled by the control unit 22 via the signal wires 18, exposes the full cross-section of the suction pipe 19. After the fillet has passed through the processing stations described, it is transported away out of the range of action of the device 1 by the skinner 14 with the transport means 30, for further processing.

The transport system generates at precise intervals of for example 20 mm, by means of a clock signal generator 16, a clock signal which passes via a control/signal wire 18 to the regulating/control device 22, as shown e.g. in FIG. 1.

The video images of the electronic camera 8 are detected by the image computer for example at 25 images per second. The images are first stored temporarily in a precise memory area of the image computer 10.

When the clock signal comes from the clock signal generator 16 of the transport system, an evaluation is made of the last image recorded and stored. The transition line to a shaded region 31 which is formed by the shading element 9 in connection with the light source 7 is examined. Here it is relevant whether it is a question of a straight shadow line 33 or a deflected shadow line 34, that is, a so-called contour line, as shown in FIG. 3b. Due to projection of a straight edge, a projected shadow line occurs at a precise region on the conveyor belt 4. Shading is effected by the plane 9 which is mounted in the lighting chamber in such a way that it does not lie in the field of recording or vision of the camera, wherein the field of vision of the camera is composed of the shaded region 31 and the illuminated image region 32, which can be seen in FIG. 1. The shaded region 31 produced by the shading element 9 lies in the field of vision of the camera. On account of the angle between the light source and the camera, the shadow line in the camera image varies with respect to location and form when an object lies on the conveyor belt. If therefore there is deformation, the presence of a fillet on the conveyor belt is deduced.

If there is no fillet present, the current image in the memory of the image computer 10 is erased. But if there is a fillet present, a copy of the shadow line is filled in another memory area of the image computer, as shown in FIG. 2a. Therefore, a topology map of the fillet is built up each time at the predetermined transport intervals. As soon as a fillet has been completely transported out of the shadow region, if there is a straight shadow line again after the deformations of the shadow line, a complete copy of the current camera image is stored in another memory area of the image computer 10, as can be seen in FIG. 2c. Immediately afterwards, image analysis is commenced on the copied image.

Each individual contour line 34 is analysed with the aid of so-called curve discussion, which as a result allows a statement about the contour shape of the area under analysis. In the location which is directly in the region to be analysed and in which the height is equal to zero, lies the outer boundary of the fish fillet. If these zero points are now joined e.g. by mathematical methods such as spline interpolation or the like methods, the result is a computer-generated outer contour which in combination e.g. with the detected contour shape allows a statement about the volume of the product presented. By multiplication of the relative density of the product, therefore, a statement about the weight of each individual product is possible.

First the recorded topology map is brought into register with the copied image. In a first step the topology reproduces the outer boundary of the fillet—its contour.

Next the contour is related to that of a representative fillet (standard fillet) stored in the image computer. This standard fillet contains information on morphological peculiarities of a given species, e.g. where the so-called pinbones are located. This can be illustrated in such a way that the standard fillet is pulled like a rubber skin into the contour of the fillet to be examined. In the process the external shape of the standard fillet can be distorted, but the basic proportions are preserved. In particular the position to be expected of the pinbone strip is therefore already clearly confined.

In the confined region of the position to be expected of the pinbone strip, a further analysis of the topology map is made. For each individual shadow line 34 the point which on account of the contour shape is located on the desired pinbone line is computer analysed, and there is differential comparison of the actual contour line with a mathematical curve.

The pinbone points thus derived from the contour lines are combined by a polynomial approximation into a smoothed line. This line is widened by a given tolerance, so that there is now further confinement of the possible pinbone line position 34, as can be seen from FIG. 3.

Within the given tolerance range, an analysis of the copied image is then made. With a mathematical filter function, in the halftones of the image a kind of trench structure is sought (lighter picture points merge with darker ones and then again with lighter ones). Here, use is made of the fact that the fat and cartilage strip in which the pinbones are embedded can be seen in the halftone image as a darker line. The points within the tolerance range which exhibits this trench structure are utilised as pinbone points.

The number of points found is again smoothed by a polynomial approximation and the polynomial parameters are transmitted via a RS 232 data link from the image computer 10 to the regulating/control device 22 which controls the stepping motors for the pinbone cut or ventral flank cut.

An improvement in visibility of the fat line is made in an alternative embodiment by means of lighting properties and optical glass filters. As the fat lines 38 which can be seen in FIG. 3 are reddish or brownish, an increase in contrast can be obtained with blue light. The possible pinbone position 39 is also shown in FIG. 3. The use of blue glass filters for the unshaped image region 32 is provided in combination with red glass filters for the shaded region 31. In a further alternative embodiment it is provided, as shown in FIG. 4, that several paths, e.g. two of them, are arranged adjacent to each other in order thus to process simultaneously the two fish halves arising for each fish.

In an alternative embodiment there is provision for the use of a camera to determine the contour lines and the use of a further camera to determine the halftone images, the two cameras cooperating in the manner already described with the device or its image computer 10.

The horizontal blade 21 shown in FIG. 5 has at the circumference an essentially blunt edge 36 which is not designed as a cutting edge. The actual cutting edges 35 are concealed in the sawtooth-like structure of the blade.

An alternative embodiment of the horizontal blade 21 shown in FIGS. 6a, b has on its lower side or on the side facing towards the fish skin two undercuts 37 which seem suitable for receiving in compensated fashion any cut remains arising as well as fish fillet which is added, in order not to hinder the cut in itself.

In FIG. 7 are shown the different cutting variants which can be obtained with the device according to the invention. First there is the so-called pinbone cut, which is produced with circular blades 13 from FIG. 1 from the fillets presented, after the element for position decision 11 in cooperation with the image computer 10 and the regulating/control device 22 has determined the position of the pinbones and transmitted it to the circular blades 13 via stepping motors 15, 26 as a cutting signal.

In the so-called ventral flank cut, in addition the horizontal blade 21 cuts off a piece from the ventral flank. The following cutting variants such as loin/tail cut and trim cut are in each case variants of the types of cut described above.

In a further embodiment according to FIG. 8, skinning takes place already before actual processing.

In FIG. 1 the fillet is produced after processing with a skinner 14. In the variant shown in FIG. 8 the preliminary skinning takes place in the device which is also referred to as a BA 53. Of this arrangement it is promised that the cuts can be made even more precisely.

With the device according to the invention there is therefore the possibility of making both pinbone cuts and loin/tail cuts or trim cuts or ventral flank cuts. Further it is possible to detect pectoral fins, walking sticks, black ventral skin and/or blood spots. The separated residual pieces such as pinbone pieces or ventral flank are conveyed separately out of the machine, so that in this way they are available for subsequent further processing.

Reference Numbers 1 device for processing fish
2 housing
3 transport means
4 perforated conveyor belt
5 suction box
6 vacuum pump
7 transmitter (light source)
8 receiver (electronic camera)
9 shading element
10 image computer
11 element for position detection
12 separating means
13 circular blade
14 skinner
15 stepping motor
16 speed pick-up/clock signal generator
17 blade drive motor
18 control/signal wires
19 suction pipe
20 drive mechanism of horizontal blade
21 horizontal blade
22 regulating/control device
23 conveyor belt drive motor
24 circular blade lifting/lowering device
25 reduction gear for flexible shaft
26 stepping motor
27 common blade support
28 blade pivot device
29 control valve
30 transport means
31 shaded region
32 illuminated image region
33 straight shadow line
34 deflected shadow line
35 cutting edge
36 blunt edge
37 undercut
38 fat line
39 possible pinbone position

What is claimed is:

1. A fish processing [device] *apparatus* for processing a fish body, including at least one transport means adapted to move the fish body, at least one embodiment which detects the position of the fish body, at least one separating means for making variant cuts of the fish body, and at least one regulating and/or control [device] *apparatus*, wherein [the] *said at least one* element is electronically connected with [the] *said at least one* separating means via [the regulating] *said at least one regulating* and/or control [devices] *apparatus* and said[,] *at least one* element provides information to be recorded and processed into data of at least two kinds, said *at least* two kinds of data measure a topology of the meat to permit fat trimming cuts of the fish body and measure a position/geometry of a piece of meat to perform separating cuts, said [measuring] *at least two kinds of* data controlling said *at least one* separating means to make said trimming cuts of fat and said separating cuts of meat into meat portions*, and wherein said at least one element consists of a transmitter and a receiver for recording the geometric and image data and wherein the receiver is a single camera and the transmitter and receiver are positioned above said at least one transport means.*

2. The [device] *apparatus* according to claim 1, wherein [the] *said at least one* element for position detection is for recording information as well as for generating and processing the information into geometrical data and/or image data.

3. The [device] *apparatus* according to claim 1, wherein [the separating] *said at least one separating* means is controllable for the removal of areas of different consistency.

4. The [device] *apparatus* according to claim 1, wherein [the] *said at least one* element for position detection includes at least one [transmitter, at least one receiver, at least one] shading element and at least one computer-assisted image processing system.

5. The [device] *apparatus* according to claim 4, wherein [the] *said at least one* shading element is arranged between the transmitter and a projection surface.

[6. The device according to claim 4, wherein the receiver is a camera.]

7. The [device] *apparatus* according to claim 1, wherein [the] *said at least one* separating means is arranged essentially freely slidably in a space in order to make precise cuts.

8. The [device] *apparatus* according to claim 1, wherein [the] *said at least one* separating means comprises at least one circular blade.

9. The [device] *apparatus* according to claim 1, wherein [the] *said at least one* separating means comprises at least two essentially parallel, spaced-apart circular blades, wherein a cutting plane of the circular blades lies essentially perpendicularly to [the] *a* conveying plane.

10. The [device] *apparatus* according to claim 9, wherein [the] *said at least one* separating means comprises at least one blade in addition to said two blades, whose cutting plane selectively lies essentially parallel or essentially perpendicular to [the] *a* conveying plane.

11. The [device] *apparatus* according to claim 10, wherein [the] *said* transmitter is a light source and [the] *said* receiver is an optoelectronic system.

12. The [device] *apparatus* according to claim 1, wherein [the] *said at least one transport means comprises a conveyor belt and said at least one* separating means comprises at least two essentially parallel, spaced-apart circular blades arranged within an angular range from 45° to 90° to [the] *said* conveyor belt.

13. A method for processing flesh, including the following steps:

transport of the flesh by [a] *said at least one* transport means into [the] *a* processing region of a device for processing flesh according to claim 11, detection of the position and/or properties of the flesh by [means of the] *said at least one* element for position detection by recording information and processing the information into the data of two kinds, *and* driving [the] *said at least one* separating means with [the] *said at least one* regulating and/or control [device] *apparatus* and performing separating cuts and/or trimming cuts with the aid of the detected data according to a preselected processing program,

*characterized in that transmission and receiving of signals for detection of the position and/or properties of the flesh takes place from above said at least one transport means and the geometric data and image data are recorded by a single camera which is a component of said at least one element.*

14. The method according to claim 13, wherein [the] *said at least one* element for position detection processes the recorded information into geometrical data and/or image data and accordingly via [the] *said at least one* regulating and control means controls [the] *said at least one* separating means to perform separating cuts and/or trimming cuts.

[15. The method according to claim 13, wherein images are recorded by means of a camera.]

16. The method according to claim 13, wherein several complete images of the flesh to be processed are recorded, at a rate of 25 images per minutes, and image details and/or complete images are stored and later process for control of [the] *said at least one* separating means.

* * * * *